(12) United States Patent
Yeh et al.

(10) Patent No.: US 8,117,404 B2
(45) Date of Patent: Feb. 14, 2012

(54) MISALIGNMENT PREDICTOR

(75) Inventors: Tse-Yu Yeh, Cupertino, CA (US);
Po-Yung Chang, Saratoga, CA (US);
Eric Hao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1636 days.

(21) Appl. No.: 11/200,771

(22) Filed: Aug. 10, 2005

(65) Prior Publication Data
US 2007/0038847 A1 Feb. 15, 2007

(51) Int. Cl.
*G06F 12/00* (2006.01)
(52) U.S. Cl. .......... 711/154; 711/E12.006; 711/E12.015
(58) Field of Classification Search .................. 711/154
See application file for complete search history.

(56) References Cited

U.S. PATENT DOCUMENTS

| | | | |
|---|---|---|---|
| 4,760,519 A * | 7/1988 | Papworth et al. | 712/217 |
| 5,574,872 A * | 11/1996 | Rotem et al. | 712/200 |
| 5,577,200 A * | 11/1996 | Abramson et al. | 714/50 |
| 6,704,854 B1 | 3/2004 | Meier et al. | |
| 2004/0064663 A1 * | 4/2004 | Grisenthwaite | 711/169 |
| 2005/0114845 A1 * | 5/2005 | Devor et al. | 717/130 |

* cited by examiner

*Primary Examiner* — Pierre-Michel Bataille
*Assistant Examiner* — Christopher Birkhimer
(74) *Attorney, Agent, or Firm* — Lawrence J. Merkel; Meyertons, Hood, Kivlin, Kowert & Goetzel, P.C.

(57) ABSTRACT

In one embodiment, a processor comprises a circuit coupled to receive an indication of a memory operation to be executed in the processor. The circuit is configured to predict whether or not the memory operation is misaligned. A number of accesses performed by the processor to execute the memory operation is dependent on whether or not the circuit predicts the memory operation as misaligned. In another embodiment, a misalignment predictor is coupled to receive an indication of a memory operation, and comprises a memory and a control circuit coupled to the memory. The memory is configured to store a plurality of indications of memory operations previously detected as misaligned during execution in a processor. The control circuit is configured to predict whether or not a memory operation is misaligned responsive to a comparison of the received indication and the plurality of indications stored in the memory.

31 Claims, 6 Drawing Sheets

MISALIGNMENT PREDICTOR

BACKGROUND

1. Field of the Invention

This invention is related to the field of processors and, more particularly, to handling misaligned memory operations in processors.

2. Description of the Related Art

Processors generally include support for memory operations to facilitate transfer of data between the processors and memory to which the processors may be coupled. As used herein, a memory operation is an operation specifying a transfer of data between a processor and a main memory (although the transfer may be completed in cache). Load memory operations specify a transfer of data from memory to the processor, and store memory operations specify a transfer of data from the processor to memory. Memory operations may be an implicit part of an instruction which includes a memory operation, or may be explicit load/store instructions. Load memory operations may be more succinctly referred to herein as "loads". Similarly, store memory operations may be more succinctly referred to as "stores".

A given memory operation may specify the transfer of multiple bytes beginning at a memory address calculated during execution of the memory operation. For example, 16 bit (2 byte), 32 bit (4 byte), and 64 bit (8 byte) transfers are common in addition to an 8 bit (1 byte) transfer. The address is typically calculated by adding one or more address operands specified by the memory operation to generate an effective address or virtual address, which may optionally be translated through an address translation mechanism to a physical address of a memory location within the memory. Typically, the address may identify any byte as the first byte to be transferred, and the additional bytes of the multiple byte transfer are contiguous in memory to the first byte and stored at increasing (numerical) memory addresses.

Since any byte may be identified as the first byte, a given memory operation may be misaligned. Various processors may define misalignment in different ways. Misaligned memory operations may, in some cases require additional execution resources (as compared to an aligned memory operation) to complete the access. For example, a processor may implement a cache having cache lines. If one or more of the bytes operated upon by the memory operation are in one cache line and the remaining bytes are in another cache line, two cache lines are accessed to complete the memory operation as opposed to one cache line if the accessed bytes are included within one cache line.

Determination of whether or not a given memory operation is misaligned generally does not occur until the memory operation is executed (during which the address is generated). Correctly allocating resources to perform the memory access (aligned or misaligned) may thus be complex.

SUMMARY

In one embodiment, a processor comprises a circuit coupled to receive an indication of a memory operation to be executed in the processor. The circuit is configured to predict whether or not the memory operation is misaligned. A number of accesses performed by the processor to execute the memory operation is dependent on whether or not the circuit predicts the memory operation as misaligned.

In another embodiment, a misalignment predictor is coupled to receive an indication of a memory operation, and comprises a memory and a control circuit coupled to the memory. The memory is configured to store a plurality of indications of memory operations previously detected as misaligned during execution in a processor. The control circuit is configured to predict whether or not a memory operation is misaligned responsive to a comparison of the received indication and the plurality of indications stored in the memory.

In still another embodiment, a method comprises: predicting whether or not a memory operation to be executed in a processor is misaligned; performing a first number of accesses to execute the memory operation if the memory operation is predicted to be aligned; and performing a second number of accesses greater than the first number to execute the memory operation if the memory operation is predicted to be misaligned.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

A processor may include a misalign predictor that predicts which memory operations are likely to be misaligned. In response to a prediction of misalignment, the processor may increase the number of accesses performed during execution as compared to the number of accesses performed if no misalignment is predicted. For example, a memory operation that is defined to access a doubleword, word, or halfword may be performed with one access if not misaligned, and two accesses if misaligned. In the misaligned case, the two accesses may access portions of the doubleword, word, or halfword that exist on either side of the misalignment boundary. A word may be defined as any number of bytes, depending on the instruction set architecture implemented by the processor. In one embodiment, a word is 4 bytes. Other embodiments may define a word as more or fewer bytes.

Various embodiments of the processor may define misalignment in various fashions. Generally, a memory operation may be misaligned if the data accessed by the memory operation "crosses" a misalignment boundary (that is, the data includes one or more bytes on each side of the misalignment boundary). The misalignment boundary may be defined differently in different embodiments, but may generally be defined at regular intervals in the memory space. The misalignment boundary may be defined, for example, based on the hardware capabilities of the processor. For example, some embodiments may implement a data cache that may permit access to any set of bytes within a cache line of the cache in response to an access. In such embodiments, the misalignment boundary may be the cache line boundary. That is, the misalignment boundary may be between each pair of addresses in memory at which a cache line ends and another cache line begins. If data accessed for a memory operation exists in two cache lines, the memory operation may be misaligned. In other embodiments, the cache line may be stored across several banks in a cache and the cache may permit access to one bank in response to an access. In such embodiments, the bank boundary may be the misalignment boundary. Any definition of a misalignment boundary may be used in various embodiments. An access to one or more bytes, as used herein, may refer to either a read of the bytes (in the case of a load) or a write of the bytes (in the case of a store).

In one embodiment, the misalign predictor predicts memory operations that have been fetched or are being fetched, and provides the prediction to a decode unit. The decode unit may generate microoperations (microops) for execution in the processor. For the non-misaligned case of doubleword, word, or halfword memory operation, the decode unit may generate one memory operation microop if misalignment is not predicted and two memory operation microops if misalignment is predicted. If misalignment is detected during execution of the memory operation microop and misalignment was not predicted, the processor may flush the pipeline and refetch the misaligned memory operation (generating two microops in the second iteration). If misalignment is correctly predicted, the flush and refetch may be avoided.

In other embodiments, microop generation may not be implemented in the processor. The misalignment prediction may be carried with the instruction through the pipeline of the processor. When scheduling the instruction for execution, the processor may use the prediction to schedule one or two accesses during execution of the instruction. Having the prediction may simplify the allocation of resources to execute the instruction when misalignment occurs, in some embodiments, since the prediction may be used prior to generation of the address whereas actual detection of misalignment may not occur until the address is generated. That is, the prediction provides information prior to the execution of the instruction, permitting earlier scheduling decisions to be made for the instruction.

In some embodiments, the instruction set architecture may support string instructions in which a single instruction is defined to access a variable number of bytes starting at the address specified by the address operands of the instruction. The number of bytes is specified by a byte count operand. The decode unit may generate multiple microops to access a given size (e.g. a word), and the number of generated microops may depend on the byte count. In such embodiments, the misalign predictor may predict which microop in the set of microops is misaligned, if misalignment is predicted. The decode unit may generate more memory operation microops for a string instruction if misalignment is predicted than if misalignment is not predicted (including two memory operation microops for the word access(es) that cross a misalignment boundary).

The misalign predictor may generate a prediction for a given memory operation at any point in the processing of the given memory operation that is prior to generating the address that the memory operation is to access. For example, the misalign predictor may generate predictions during the fetch of memory operations, during decode, during scheduling, etc.

An example implementation will be described in more detail below for an embodiment of a processor that implements an instruction set architecture that includes explicit load/store instructions. Particularly, the PowerPC™ instruction set architecture will be used as an example. Other instruction set architectures may be implemented in other embodiments, including instruction set architectures that include implicit memory operations. Exemplary instruction set architectures that may be implemented in other embodiments may include the ARM™ instruction set, the MIPS™ instruction set, the SPARC™ instruction set, the x86 instruction set (also referred to as IA-32), the IA-64 instruction set, etc.

Figure 1:
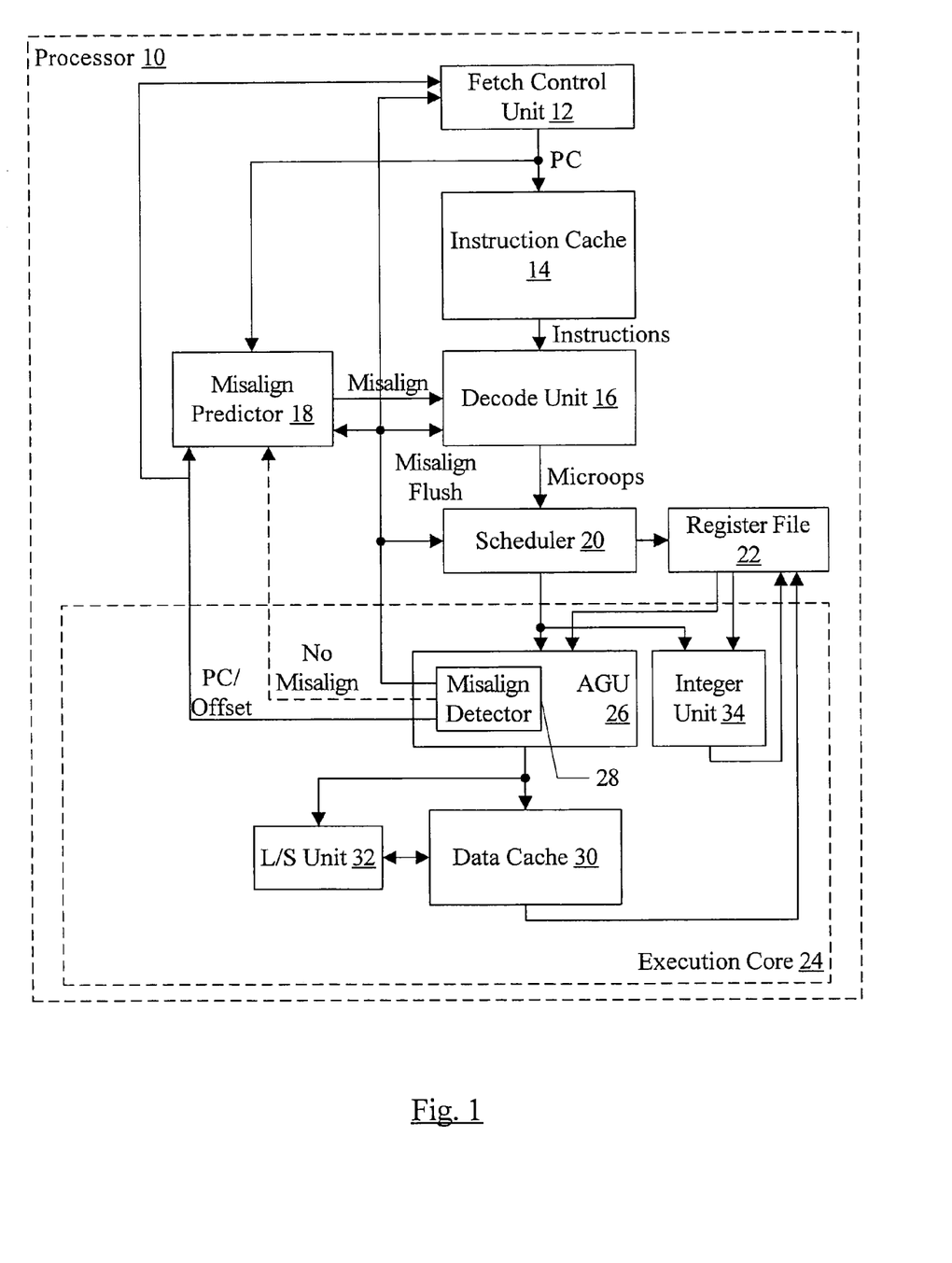
FIG. 1 is a block diagram of one embodiment of a processor.

Turning now to FIG. 1, a block diagram of one embodiment of a processor 10 is shown. In the illustrated embodiment, the processor 10 includes a fetch control unit 12, an instruction cache 14, a decode unit 16, a misalign predictor circuit 18, a scheduler 20, a register file 22, and an execution core 24. In the illustrated embodiment, the execution core 24 includes an address generation unit (AGU) 26 which includes a misalign detector circuit 28, a data cache 30, a load/store unit 32, and an integer unit 34. The fetch control unit 12 is coupled to provide a program counter (PC) for fetching from the instruction cache 14 and is coupled to receive a misalign flush signal from the misalign detector 28. The PC from the fetch control unit 12 is also provided to the misalign predictor 18. The instruction cache 14 is coupled to provide instructions to the decode unit 16, which is coupled to provide microops to the scheduler 20. The decode unit 16 is also coupled to receive misalignment information from the misalign predictor 18 and the misalign flush signal from the misalign detector 28. The scheduler 20 is coupled to receive the misalign flush signal, is coupled to the register file 22, and is coupled to provide microops for execution to the address generation unit 26 and the integer unit 34. The register file 22 is coupled to provide operands to the address generation unit 26 and the integer unit 34, and is coupled to receive results to be written to the register file 22 from the integer unit 34 and the data cache 30. The address generation unit 26 is configured to provide an address to the data cache 30 for access, and also provides the address to the load/store unit 32. The load/store unit 32 is coupled to the data cache 30. The misalign detector 28 is coupled to provide a PC of a misaligned memory operation and an offset to the misalign predictor 18 and the fetch control unit 12. Additionally, in some embodiments, the misalign detector may signal no misalignment for a memory operation (No Misalign in FIG. 1). It is noted that the PC of an instruction may be an address that locates the instruction itself in memory. That is, the PC is the address that may be used to fetch the instruction. The PC may be an effective or virtual address that is translated to the physical address actually used to access the memory, or may be a physical address, in various embodiments.

The misalign predictor 18 may predict which memory operations are likely to be misaligned, and may provide the prediction to the decode unit 16. The decode unit 16 may be configured to generate memory operation microops in response to a memory operation fetched from the instruction cache 14. If the misalign predictor 18 predicts misalignment for a non-string memory operation, the decode unit 16 may generate two memory operation microops. The two microops may perform the portions of the misaligned access on opposite sides of the misalignment boundary. If the misalign predictor 18 does not predict misalignment for a non-string memory operation, the decode unit 16 may generate one memory operation microop.

The first memory operation microop generated by the decode unit 16 may use the address operands of the memory operation instruction to form the address to be accessed. The second memory operation microop may use the address from the first memory operation microop, incremented by the size of the memory operation (e.g. doubleword, word, or halfword). In some embodiments, the decode unit 16 may generate a microop between the first memory operation microop and the second memory operation microop to facilitate the address generation for the second memory operation microop. For example, the intervening microop may add the address operands of the instruction and write the result to a register that may be used as an address operand of the second memory operation microop. The intervening microop may also add the size increment, or the size increment may be included in the address operands of the second memory operation microop, in various embodiments. In still other embodiments, if the address operands and the size increment may all be provided as address operands of the second memory operation microop, the intervening microop to add the address operands need not be generated.

For loads, the decode unit 16 may also generate another microop after the second memory operation microop. The additional microop may combine the results of the two memory operation microops to form the final result for writing into the target register of the load.

The decode unit 16 may generally be configured to generate microops for each instruction provided from the instruction cache 14. Generally, the microops may each be an operation that the hardware included in the execution core 24 may be capable of executing. Each instruction may translate to one or more microops which, when executed, result in the performance of the operations defined for the instruction according to the instruction set architecture. When more than one microop is generated for a given instruction, the microops may have an order similar to the program order of instructions in a program. References to microops "in between" other microops, "after" other microops, "before" other microops, etc. may refer to this order. The actual generation of microops may occur in parallel, in some embodiments. Additionally, the actual execution of microops may occur out of order (e.g. the first memory operation microop and the microop that adds the address operands for the second memory operation microop may execute in any order, since there is no read after write dependency between them).

The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment.

Microops generated by the decode unit 16 may be provided to the scheduler 20, which may store the microops and may schedule the microops for execution in the execution core 24. The PC of the instruction corresponding to each microop may also be stored by the scheduler 20. In some embodiments, the scheduler 20 may also implement register renaming and may map registers specified in the microops to registers included in the register file 22. When a microop is scheduled, the scheduler 20 may read its source operands from the register file 22 and the source operands may be provided to the execution core 24. For memory microops, the source operands include address operands used to generate the address of the memory location accessed by the memory operation. Address operands of a memory operation may include register operands provided from the register file 22 as well as displacement operands encoded in the memory operation itself.

Memory operation microops may be scheduled to the address generation unit 26, which generates the address of the memory operation from the address operands. If address translation is enabled, the address generated by the address generation unit 26 may be an effective address or virtual address, to be translated to a physical address through the address translation mechanism. For example, the data cache 30 may include address translation hardware such as a translation lookaside buffer that stores the results of previous translations. Alternatively, separate memory management unit (MMU) hardware may be provided to perform translations, or the address generation unit 26 may include the MMU hardware.

The address generation unit 26 includes a misalign detector 28 configured to detect misaligned memory operations. For microops generated responsive to a misalignment prediction, misalignment may not be detected. Generally, the misalign detector 28 may receive the address (or a least significant portion thereof) and the size of the memory operation to determine if the memory operation crosses the misalignment boundary.

If the misalign detector 28 detects misalignment, the misalign detector may signal misalign flush to cause the misaligned memory operation microop and subsequent microops to be flushed from the processor pipeline. Additionally, the misalign detector 28 may provide the PC of the instruction that corresponds to the memory operation microop to the misalign predictor 18 and the fetch unit 12. In FIG. 1, the misalign flush signal is shown being provided to the scheduler 20, the decode unit 16, and the fetch control unit 12. The decode unit 16 may simply discard any instructions/microops that it is processing. The fetch control unit 12 may reset fetching to the PC of the memory operation microop that was misaligned (provided by the misalign detector 28), to refetch the corresponding instruction. If the instruction cache 14 is pipelined, the instruction cache 14 may also receive the misalign flush signal to discard fetched instructions that are being flushed.

The scheduler 20 may discard the microop being flushed and any subsequent microops. In one embodiment, the scheduler 20 may track which microops are in which pipeline stages in the execution core 24, and may thus associate the misalign flush signal with the appropriate microop. In other embodiments, the misalign flush signal may also identify the microop to the scheduler (e.g. using a tag that identifies the entry in the scheduler that stores the microop).

The misalign predictor 18 may respond to the misalign flush by updating to subsequently predict the memory operation corresponding to the microop as misaligned. For example, the misalign predictor 18 may include a memory that stores PCs of memory operations that have previously been detected (during previous executions) as being misaligned. The misalign predictor 18 may update the memory to store the PC provided by misalign detector 28 (received from the scheduler 20 along with the memory operation microop).

Subsequent fetches of the instruction may match the PC stored in the memory, and the misalign predictor 18 may predict that the memory operation is misaligned. Thus, the misalign predictor 18 may predict misalignment of memory operations based on previous executions of the memory operations, in this embodiment. While the PC is used to identify memory operations in the misalign predictor 18, other embodiments may use other information corresponding to the memory operation as a basis for prediction.

As mentioned previously, string instructions may also be supported. In the absence of a misalignment prediction, the decode unit 16 may generate multiple microops for string operations, each of which performs one access of the size of the string instruction. The number of microops generated may be based on a count operand of the string instruction.

With a string instruction, even if the first memory operation microop is not misaligned, a subsequent memory operation microop of the string may be misaligned. The misalignment detector may detect if a misaligned microop is part of a string, and may identify which microop in the string sequence is misaligned. For example, in one embodiment, each memory operation microop may include a displacement offset that may be added to the other address operands of the string instruction to generate the address of a given word in the string. Each memory operation microop in a string sequence has a different offset. The misalign detector 28 may provide the offset of the microop that is misaligned, in addition to the PC of the string instruction, to the misalign predictor 18. The misalign predictor 18 may update with the offset, and may provide the offset when misalignment of the string instruction is subsequently predicted. The decode unit 16 may generate two memory operation microops for that offset, similar to the handling of non-string memory operations described above.

Additionally, depending on the byte count of the string instruction and the definition of the misalignment boundary, subsequent memory operations in the string may also be misaligned. The decode unit 16 may be configured to detect that another misalignment boundary is to be crossed by subsequent memory operation microops, and may generate two memory operation microops for each of the subsequent memory operation microops as well, responsive to the prediction by the misalign predictor 18.

In some embodiments, the misalign detector 28 may also be configured to detect that misalignment was predicted by the misalign predictor 18 but misalignment was not actually experienced. If misalignment was predicted but not detected, the misalignment detector may signal no misalign to the misalign predictor 18 and may provide the PC (and offset for string instructions) similar to providing the PC (and offset) for misalignment detection. The misalign predictor 18 may update to not predict misalignment for the corresponding instruction. Removing misalignment predictions from the misalignment predictor 18 may not be implemented in other embodiments. The microop sequence generated in response to a misalign prediction may generate the correct result if misalignment does not actually occur.

In some embodiments, updating the misalign predictor 18 may include more than allocating in response to a detected misalignment that was not predicted and optionally invalidating in response to a lack of misalignment when misalignment is predicted. For example, a strength bit or counter may be used to indicate how often misalignment has occurred. A misalign predictor 18 entry may be allocated in the weak (or weakest) state. For each correct prediction of misalignment, the strength may be increased and for each incorrect prediction of misalignment, the strength may be decreased. If an incorrect prediction is detected and the entry is in the weakest state, the entry may be invalidated. Any mechanism for updating the misalign predictor 18 may be used in various embodiments.

The misalign detector 28 may detect that misalignment was predicted in a variety of fashions. For example, the memory operation microops generated in response to a misalignment prediction may by coded differently than other memory operation microops (e.g. to provide different operation than typical memory operation microops, as described in more detail below for the load/store low and load/store high microops). Thus, the misalign detector 28 may detect that a misalignment was predicted but the generated address actually does not cross a misalignment boundary for the size of the overall memory operation. In other embodiments, additional information pipelined with the microops may be used to detect microops for which misalignment predictions were made.

The address generated by the address generation unit 26 may be provided to the data cache 30 and to the load/store unit 32. For loads that hit in the data cache 30, the data cache 30 may provide the corresponding data to the register file 22 for writing in the target register of the load. For stores, the store data may be provided to the load/store unit 32 for queuing until the store is committed, at which time the data cache 30 may be updated with the store data. The load/store unit 32 may also enforce various load/store ordering rules, participate in cache miss handling, etc.

In the embodiment of FIG. 1, the execution core 24 also includes an integer unit 34. The integer unit 34 may be configured to perform various integer operations. For example, the integer unit 34 may be configured to execute the microop that adds the address operands of a memory operation to produce an address operand for the second memory operation microop. The integer unit 34 may also be configured to execute the microop that combines the results of the first and second load microops for a misaligned load and writes the result in the target register of the load.

The register file 22 may generally comprise any set of registers usable to store operands and results of microops executed in the processor 10. In some embodiments, the register file 22 may comprise a set of physical registers and the scheduler 20 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via the misalign flush as described above, or other sources of redirection such as misprediction, exception, interrupt, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

While the embodiment of FIG. 1 shows the execution core 24 including an address generation unit 26, a load/store unit 32, an integer unit 34, and a data cache 30, other embodiments may include any desired components. For example, multiple address generation units, integer units, load/store units, and/or data caches may be provided. Other units may be provided as well (e.g. one or more floating point units, one or more graphics units, one or more cryptographic units, etc.). Generally, the execution core 24 may include any circuitry for executing instructions (or microops, in the illustrated embodiment).

It is noted that, while the misalign predictor 18 uses the PC generated by the fetch control unit 12 in the illustrated embodiment to make predictions, other embodiments may use the PC corresponding to instructions being output by the instruction cache 14 to the decode unit 16, or a PC that is being pipelined through the instruction cache 14. Furthermore, other embodiments may use other information to identify instructions for misalignment prediction (e.g. a portion of the instruction itself, a portion of the PC, a tag assigned to the instruction by the processor 10, etc.).

It is noted that, while the illustrated embodiment uses a scheduler, other embodiments may implement other microarchitectures. For example, a reservation station/reorder buffer microarchitecture may be used. If in-order execution is implemented, other microarchitectures without out of order execution hardware may be used.

It is noted that, while the decode unit 16 generates microops in the present embodiment, other embodiments may decode and execute instructions from the instruction set architecture directly. In such embodiments, the decode unit 16 may generate multiple instructions for memory operations predicted to be misaligned.

Figure 2:
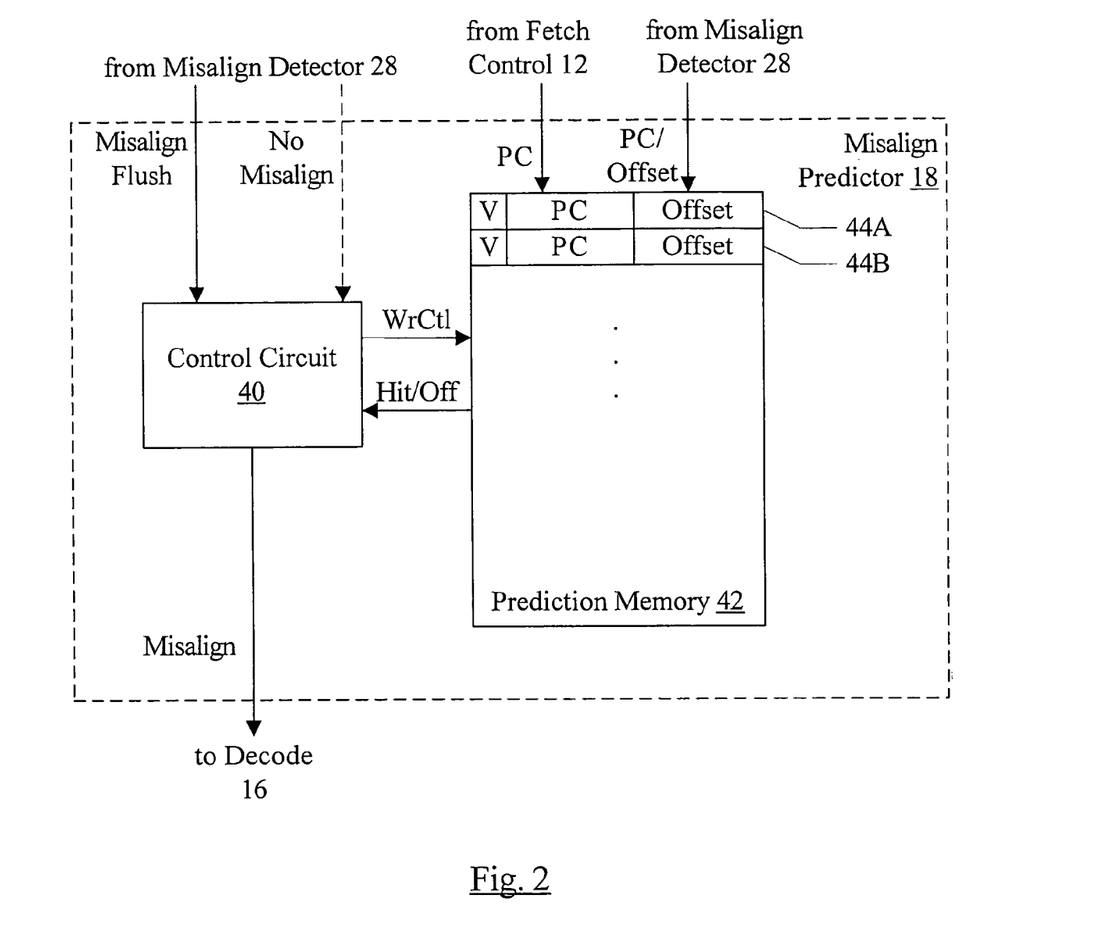
FIG. 2 is a block diagram of one embodiment of a misalign predictor.

Turning now to FIG. 2, a block diagram of one embodiment of the misalign predictor 18 is shown. In the embodiment of FIG. 2, the misalign predictor 18 includes a control circuit 40 and a prediction memory 42. The control circuit 40 is coupled to receive the misalign flush and no misalign signals from the misalign detector 28, and to send the misalign prediction output to the decode unit 16. The control circuit 40 is also coupled to the prediction memory 42. For example, in FIG. 2, the control circuit 40 is coupled via a write control (WrCtl) and a hit/offset (Hit/Off) to the prediction memory 42. The prediction memory 42 is coupled to receive the PC from the fetch control unit 12 and to receive the PC and offset from the misalign detector 28.

The prediction memory 42 may store information used to make misalignment predictions for memory operations. For example, in the illustrated embodiment, the prediction memory 42 may comprise a plurality of entries, two of which (entries 44A-44B) are illustrated in FIG. 2. Each entry 44 may include a valid bit (V) indicating whether or not the entry is valid, a PC of a memory operation that was previously executed and was misaligned, and an offset if the memory operation is a string instruction.

The PC provided by the fetch control unit 12 is coupled to the prediction memory 42, and may be compared to the PCs in the entries 44 of the prediction memory 42 to detect a hit. That is, the prediction memory 42 may be a content address memory (CAM) and the comparison may be on the PC field of the entries (qualified with the valid bit being set to indicate a hit). If a hit is detected, the prediction memory 42 may assert a hit signal to the control circuit 40 and may provide the offset from the hitting entry. The control circuit 40 may convey a misalignment prediction to the decode unit 16 responsive to detection of a hit in the prediction memory 42. The misalignment prediction may indicate whether or not misalignment is predicted, and may include the offset for string operations. In some embodiments, the hit/offset output of the prediction memory 42 may be forwarded directly as the misalignment prediction to the decode unit 16.

The control circuit 40 is coupled to receive the misalign flush signal. If a flush due to misalignment is signalled, the control circuit 40 may select an entry in the prediction memory 42 to store the PC of the misaligned instruction (and the offset, if any). The control circuit 40 may use the write control to the prediction memory 42 to cause the prediction memory 42 to update the selected entry with the PC and offset received from the misalign detect unit 28.

The control circuit 40 may manage the entries in the prediction memory 42 in any fashion. For example, the control circuit 40 may manage the entries in a first-in, first-out (FIFO) fashion in which the control circuit 40 writes PCs to consecutive entries in the prediction memory 42, overwriting the oldest entries after the prediction memory becomes full. Other embodiments may use other configurations. For example, the prediction memory 42 may be managed similar to a direct mapped or set associative cache, in which one or more entries are eligible to store a given PC. Rather than CAMming the entries to detect a hit for a PC from the fetch control unit 12, the entry or entries indexed by the PC may be read and compared to the PC. Similarly, the control circuit 40 may select an eligible entry to store a PC and offset provided by the misalign detector 28.

In some embodiments, the misalign predictor 18 may receive the no misalign signal from the misalign detector 28. If the no misalign signal indicates that a predicted misaligned memory operation was not misaligned, the control circuit 40 may search the prediction memory 42 for the PC provided by the misalign detector 28. If the PC is found, the entry may be invalidated. The search may be performed by CAMming the PC provided by the misalign detector 28 or by checking entries indexed by the PC, for example.

In some embodiments, each entry in the prediction memory 42 may include predictions for multiple instructions. For example, each entry may include predictions for the maximum number of instructions that may be concurrently fetched from the instruction cache 12. In such embodiments, if a hit is detected for a given PC, each of the predictions may be provided to the decode unit 16. The decode unit 16 may associate each prediction with the corresponding instruction received from the instruction cache 14. In such embodiments, the fetch PC used to fetch a group of instructions may be an indication of each of the instructions for misalignment prediction purposes.

While the present embodiment has been described as storing the PC in each entry of the prediction memory 42 and comparing the stored PCs to the PC received from the fetch control unit 12, other embodiments may store and compare a portion of the PC. Aliasing of PCs that differ only in the excluded bits may occur in such embodiments, but since the memory operation microops generate the correct result even if misalignment does not occur, correct operation is still experienced if an alias occurs. It is noted that the offset field may be eliminated in embodiments that do not include string instructions.

Figure 3:
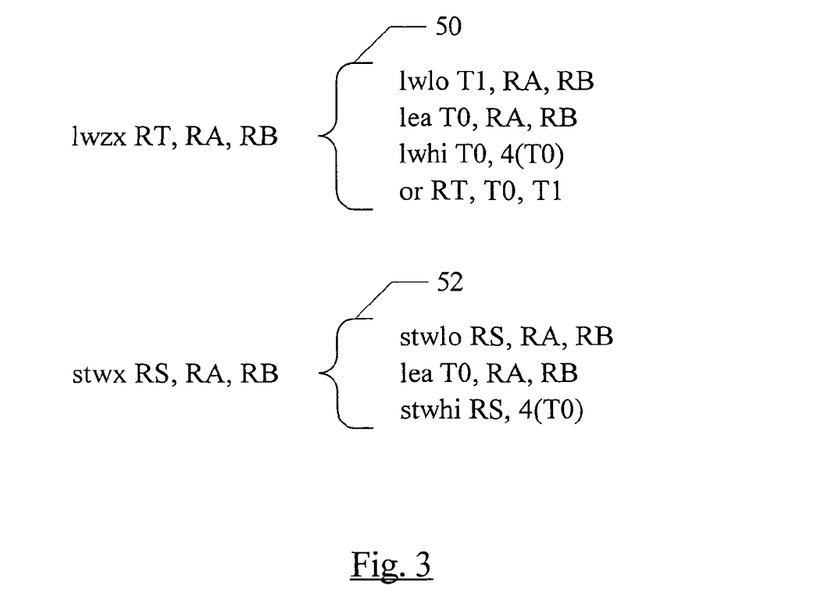
FIG. 3 is a diagram illustrating exemplary load and store instructions and corresponding microops for one embodiment.
Figure 4:
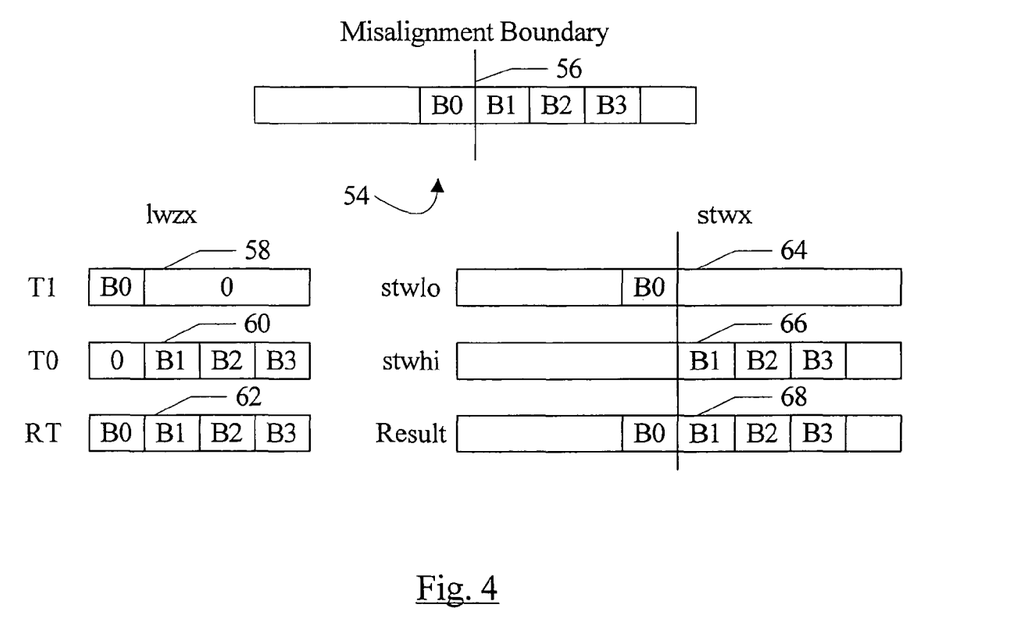
FIG. 4 is a block diagram illustrating one example of a misaligned word and a load and a store to the misaligned word.

Turning now to FIG. 3, an example of a load word zero instruction and a store word instruction as defined in the PowerPC instruction set and the corresponding microops generated for a misalignment prediction is shown for one embodiment of the processor 10. FIG. 4 is an example of the operation of the microops, for one embodiment.

The load word zero instruction (lwzx RT, RA, RB) in the example is defined to add the contents of the RA and RB registers to form the effective address, and to load the word at the memory location identified by the effective address into the RT register. In 32 bit mode, the most significant 32 bits of the RT register are zeroed. RA, RB, and RT may each be any general purpose register (of which there are 32 in the PowerPC instruction set architecture).

If the load word zero instruction is not predicted to be misaligned, a microop that performs the word load may be generated. If the load word instruction is predicted to be misaligned, the decode unit 16 may generate the microop sequence shown to the right of the brace 50 in FIG. 3. The order of the microop sequence is from top to bottom in FIG. 3 (that is, the lwlo instruction is first, followed by the lea instruction, etc.).

A load word low (lwlo) microop and a load word high (lwhi) microop are included in the microop sequence. The lwlo and the lwhi microops are load microops that are defined to complete a misaligned load. The lwlo microop is used to access the bytes below the misalignment boundary (the bytes that are stored at addresses numerically less than the address that identifies the misalignment boundary). The lwhi microop is used to access the memory above the misalignment boundary (the bytes that are stored at addresses numerically greater than the address that identifies the misalignment boundary). Similar "low" and "high" microops may be defined for other sizes of loads (e.g. halfword and doubleword).

Generally, the lwlo microop is defined to form an effective address from its address operands, to read the bytes from the generated address up to the misalignment boundary, and to write the bytes into the most significant portion of its target register. Remaining bytes in the target register may be zeroed in this embodiment.

The lwhi microop is used to read the remaining bytes of a misaligned word, storing them in the least significant portion of its target register. The most significant bytes in the target register are zeroed in this embodiment. More particularly, the lwhi microop is defined to use the least significant two bits of its effective address as the number of bytes to be read, and zeros the least significant two bits of the effective address for performing the access. If the lwhi effective address is generated by incrementing the original effective address by the size of the instruction (4 bytes), then the least significant two bits of the address are the number of bytes to be read beginning at the misalignment boundary for a given misaligned word. A load halfword high (lhhi) microop may be similar, except that it may use the least significant bit of its effective address as a byte count and may zero the least significant bit. Similarly, a load doubleword high (ldhi) microop may be similar, except that it may use the least significant 3 bits of its effective address as a byte count and may zero the least significant 3 bits. In one embodiment, if the byte count of the lwhi microop (or the lhhi or ldhi microops) is zero, then no bytes are loaded and the target register is zeroed. This operation may permit the microop sequence for predicted misaligned loads to also generate a correct result for loads that are not actually misaligned.

With the above definition of the lwlo and lwhi microops, the sequence shown to the right of the brace 50 in FIG. 3 may be explained. The lwlo instruction reads the bytes below the misalignment boundary (using the RA and RB registers as address operands to form the effective address) and writes the bytes to the temporary register T1. The load effective address (lea) microop is used between the lwlo and lwhi microops to add the address operands of the instruction and store the resulting effective address in the temporary register T0. The lea microop may be an alias to an add microop, or an add microop may be used instead of the lea microop. The effective address of the lwhi microop may be the effective address of the original instruction incremented by 4 bytes (the data size of the instruction). Thus, the address operands of the lwhi microop in the embodiment are the T0 register (storing the effective address of the original instruction) and a displacement of 4. The T0 register is also used as the target of the lwhi microop. Since, in this embodiment, the lwlo and lwhi microops zero the portions of their target registers that are not written with bytes read from memory and since the microops place each byte in the proper byte location within the target registers, the final result of the lwzx instruction may be generated by logically ORing the temporary registers that were the targets of the lwlo and lwhi microops (T0 and T1). The target of the OR microop is the target register of the lwzx instruction.

An example of the operation of the microop sequence is shown in FIG. 4. At reference numeral 54 a set of memory locations spanning a misalignment boundary indicated by line 56 is shown. The bytes to be loaded by the lwzx instruction are shown in FIG. 4 as bytes B0 to B3. Byte B0 is below the misalignment boundary and bytes B1 to B3 are above the misalignment boundary.

FIG. 4 also shows the contents of the T1 and T0 temporary registers (reference numerals 58 and 60). The T1 register is written by the lwlo instruction, and thus byte B0 is placed in the most significant byte of T1 and the remaining bytes are zero. The T0 register is written by the lwhi instruction, and thus the most significant byte of the T0 register is zero and the remaining bytes are the bytes above the misalignment boundary (B1 to B3). The result of ORing T0 and T1, in the RT register (reference numeral 62) is the set of bytes B0 to B3.

It is noted that other definitions of the microop sequence for the misaligned load may be used. For example, rather than defining special lwlo and lwhi microops, normal load microops may be used and the bytes read during execution of the load microops may be written to the least significant bytes of the temporary registers that are the targets of each load. Shifting and masking of the contents of the temporary registers may be used to generate the correct result in the target register of the load.

Returning to FIG. 3, if the store word instruction is not predicted to be misaligned, a microop that performs the word store may be generated. If the store word instruction is predicted to be misaligned, the decode unit 16 may generate the microop sequence shown to the right of the brace 52 in FIG. 3. The order of the microop sequence is from top to bottom in FIG. 3 (that is, the stwlo instruction is first, followed by the lea instruction, etc.).

The microop sequence for the store word instruction (to the right of brace 52) may be similar to the microop sequence for the load word instruction. The store word low (stwlo) instruction may write the most significant bytes of the RS register to memory locations between the location indicated by the address operands of the instruction and the misalignment boundary. The store word high (stwhi) instruction may store the remaining bytes beginning at the misalignment boundary. The effective address of the stwhi instruction may be the effective address of the instruction incremented by the size (a word, or 4 bytes, in this embodiment). The least significant two bits may be used as the byte count for the stwi instruction, and may be zeroed to provide the effective address actually used for the store. Similar definitions for the store halfword high (sthhi) and store doubleword high (stdhi) may be provided, except that one least significant bit or three least significant bits, respectively, of the effective address may provide the byte count and may be zeroed. If a byte count of zero is detected, the stwhi, sthhi, and stdhi may not store any bytes. This operation may permit a predicted misaligned store which is not misaligned to be performed properly using the microop sequence shown.

Returning to FIG. 4, an example of the operation of the microop sequence for the misaligned store word instruction is shown for the same set of bytes described previously for the misaligned load word instruction. At reference numeral 54 a set of memory locations spanning a misalignment boundary indicated by line 56 is shown. The bytes to be stored by the stwx instruction are shown in FIG. 4 as bytes B0 to B3. Byte B0 is below the misalignment boundary and bytes B1 to B3 are above the misalignment boundary.

At reference numerals 64 and 66, the updates to memory performed in response to the stwlo and stwhi microops are shown, respectively. The stwlo instruction stores byte B0 below the misalignment boundary 56, and the stwhi instruction stores the remaining bytes B1 to B3 above the misalignment boundary 56. The final result in memory is illustrated at reference numeral 68. It is noted that the final result exists in memory after execution of the stwhi instruction. Reference numeral 66 merely illustrates the portion of the update performed during execution of the stwhi instruction.

It is noted that other definitions of the microop sequence for the misaligned store may be used. For example, rather than defining special stwlo and stwhi microops, normal store microops may be used. The data to be stored may be preprocessed (e.g. using shifting and masking) to place the appropriate bytes in the least significant bytes of source registers for the store microops.

It is noted that some load instructions in the PowerPC instruction set may also specify sign extension of the result rather than zero extension. For such load instructions, an additional microop may be included to sign extend the result. Additionally, in the PowerPC instruction set, some load and store instructions specify that one of the address operand registers is updated to the effective address generated during execution of the instruction (the "load with update" and "store with update" forms of the instructions). An additional microop may be included to update the address operand register with the effective address. Furthermore, in some embodiments, floating point loads may be handled in a similar fashion, assembling the floating point load bytes in an integer general purpose register. An additional microop may be included to transfer the result to a floating point general purpose register. Floating point stores may be handled by transferring the store data to an integer register, then using a similar sequence to that above for stores.

It is noted that the PowerPC instruction set uses a variety of addressing modes for load and store instructions. The lwlo, lhlo, ldlo, stwlo, stlo, and stdlo microops may support similar addressing modes to the load/store instructions. The lwhi, lhhi, ldhi, stwhi, sthhi, and stdhi microops may support similar addressing modes, or may rely on the generation of the effective address microop to limit the addressing modes supported by these microops (e.g. and register and displacement addressing mode may be used, similar to the examples of FIG. 3, where the displacement is the size of the operation). It is noted that, while mnemonics are shown in FIG. 3, each mnemonic may correspond to binary encodings actually generated by the decode unit 16.

In other embodiments, the effective address of the load low and load high microops may be explicitly generated and stored in registers before the load low and load high microops. Such embodiments may permit the least significant address bits (defining which bytes are read/written) to be available upon reading the register from the register file 22 rather than after the address generation has occurred.

The illustrated embodiment uses "big endian" byte ordering. The PowerPC instruction set also supports a "little endian" byte ordering mode in which the order of the bytes is reversed within each data size. Such modes could be supported by defining the "low" and "high" microops to have a byte reversal mode, or by including microops to explicitly reverse the bytes before the store microops or after the load microops when in little endian mode. The PowerPC instruction set defines certain load and store instructions with byte reverse capability. Such instructions may be handled in a similar fashion to the little endian mode.

Figure 5:
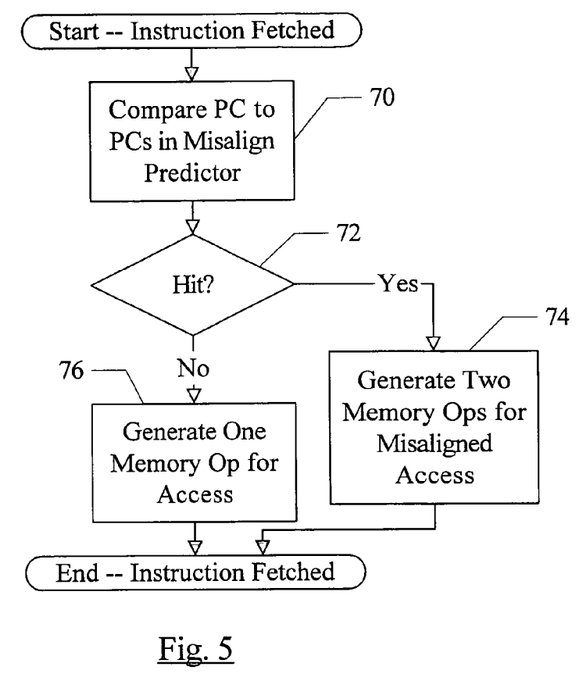
FIG. 5 is a flowchart illustrating operation of one embodiment of a misalign predictor in response to an instruction fetch.

Turning next to FIG. 5, a flowchart is shown illustrating operation of one embodiment of the processor 10 (more specifically the misalign predictor 18 and the decode unit 16) in response to fetching one or more instructions. While the blocks are shown in a particular order for ease of understanding, other orders may be used. Furthermore, blocks may be performed in parallel in combinatorial logic within the processor 10. Blocks, portions of the flowchart, or the flowchart as a whole may be pipelined over multiple clock cycles, in some embodiments.

The misalign predictor 18 may compare the PC of the fetch instruction(s) to the PCs stored in the misalign predictor 18 (block 70). If the misalign predictor 18 detects a hit (decision block 72, "yes" leg), the decode unit 16 may generate two memory operation microops to perform the misaligned access (block 74). If the misalign predictor 18 does not detect a hit (decision block 72, "no" leg), the decode unit 16 may generate one memory operation microop to perform the access (block 76). The one or two memory operation microops may be included with other microops performing other accesses if the instruction is a string instruction, as mentioned previously, for some embodiments.

Figure 6:
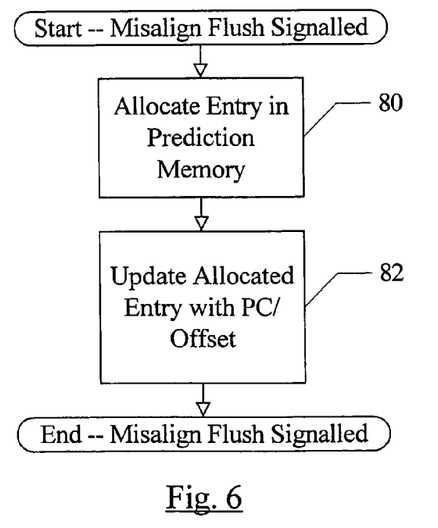
FIG. 6 is a flowchart illustrating operation of one embodiment of a misalign predictor in response to a misalignment being signalled.

FIG. 6 is a flowchart illustrating operation of one embodiment of the misalign predictor 18 in response to a misalign flush signalled by the misalign detector 28. While the blocks are shown in a particular order for ease of understanding, other orders may be used. Furthermore, blocks may be performed in parallel in combinatorial logic within the processor 10. Blocks, portions of the flowchart, or the flowchart as a whole may be pipelined over multiple clock cycles, in some embodiments.

The misalign predictor 18 may allocate an entry in the prediction memory 42 to store the PC (and offset, if applicable) of the instruction that is misaligned (block 80). The misalign predictor 18 may update the allocated memory with the PC and offset provided by the misalign detector 28 (block 82).

Figure 7:
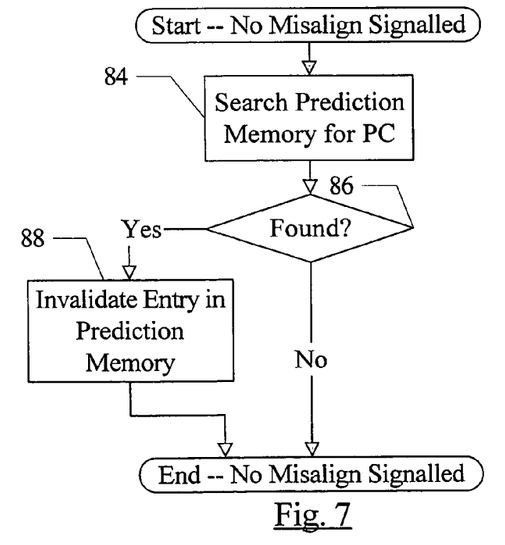
FIG. 7 is a flowchart illustrating operation of one embodiment of a misalign predictor in response to no misalignment being signalled.

FIG. 7 is a flowchart illustrating operation of one embodiment of the misalign predictor 18 in response to a no misalign signal from the misalign detector 28. While the blocks are shown in a particular order for ease of understanding, other orders may be used. Furthermore, blocks may be performed in parallel in combinatorial logic within the processor 10. Blocks, portions of the flowchart, or the flowchart as a whole may be pipelined over multiple clock cycles, in some embodiments.

The misalign predictor 18 may search the prediction memory 42 for the PC provided by the misalign detector 28 (block 84). If an entry storing the PC is found (decision block 86, "yes" leg) the misalign predictor 18 may invalidate the entry (block 88).

Figure 8:
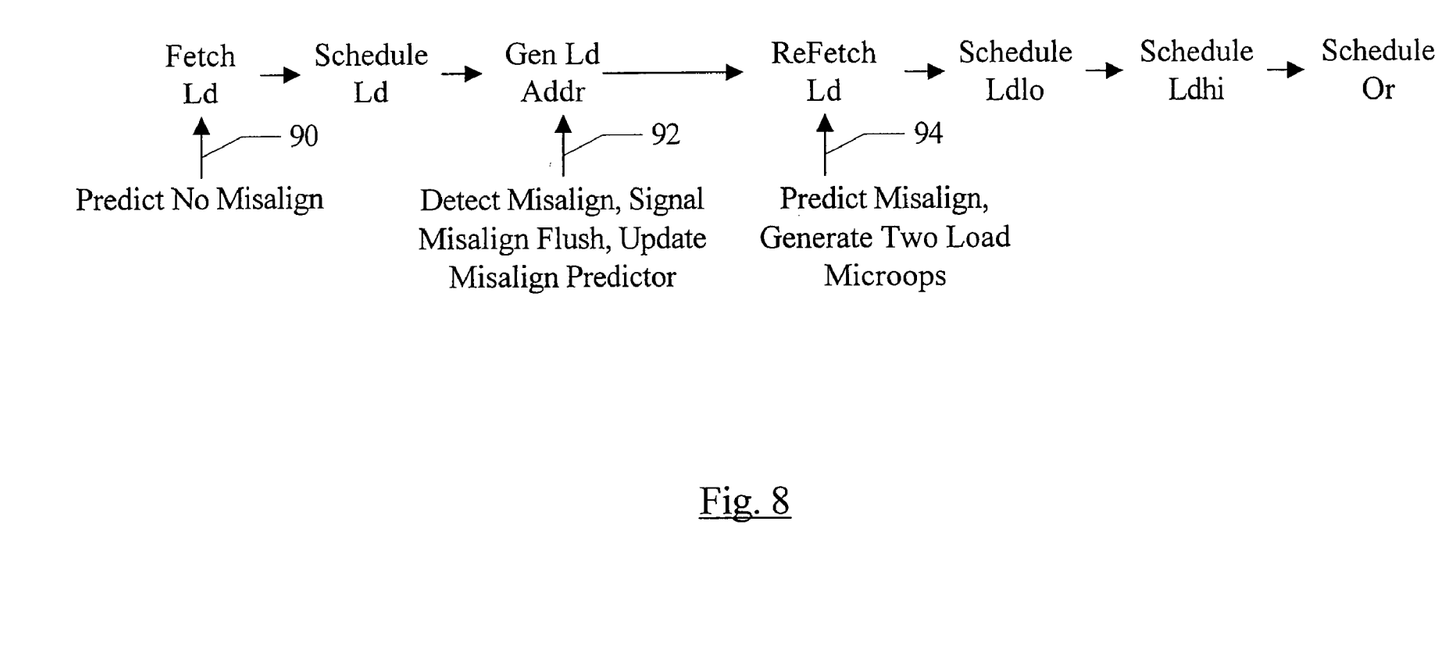
FIG. 8 is a timeline illustrating detection of a misaligned memory operation and handling of the misaligned memory operation for one embodiment.

Turning next to FIG. 8, a timeline is shown illustrating events that may occur in the processor 10 for detecting a misaligned load and later predicting the misalignment, for one example. Store instruction misalignment detection and prediction may be similar. Time generally increases from left to right in FIG. 8, in arbitrary units.

A load instruction is fetched, and is not predicted misaligned by the misalign predictor 18 (arrow 90) Accordingly, a corresponding single load microop is generated, and scheduled for execution. During execution, the address of the load microop is generated and the misalign detector 28 detects that the load is misaligned (arrow 92). The misalign detector 28 signals misalign flush, and the misalign predictor 18 updates with the PC of the load instruction. Due to the misalign flush, the load instruction is refetched from the instruction cache 14. The PC of the load instruction hits in the misalign predictor 18, and thus the misalign predictor 18 predicts that the load is misaligned (arrow 94). In response to the misalignment prediction, the decode unit generates two load microops for the load instruction (a ldlo and a ldhi, where the specific size of the generated microops depends on the size of the load instruction). The ldlo, ldhi, and OR (to merge the results of the ldlo and ldhi) are subsequently scheduled and the load instruction is subsequently completed without further flushing. Subsequent fetches of the load instruction, if the PC remains recorded in the misalign predictor 18, may be predicted as misaligned and two load microops may be generated in the initial fetch and decode. Thus, the subsequent fetches of the load instruction may avoid the misalign flush and refetch. It is noted that the ldlo and ldhi instructions are not dependent on each other and thus may be scheduled in parallel, overlapped, or scheduled in the opposite order, in various examples.

Figure 9:
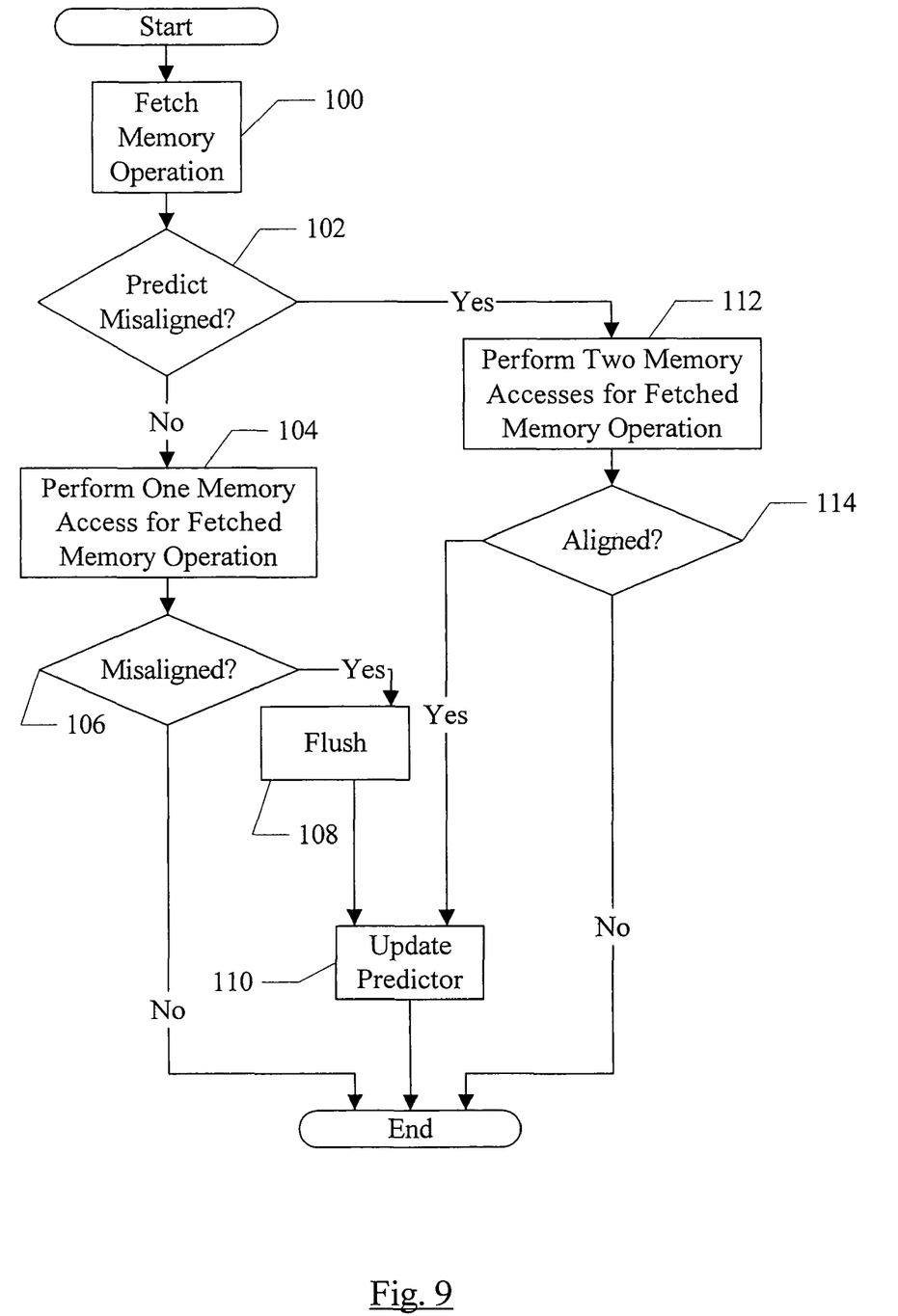
FIG. 9 is a flowchart illustrating one embodiment of a method for handling misaligned memory operations.

Turning next to FIG. 9, a flowchart illustrating a method for handling misaligned memory operations is shown. A memory operation may be fetched (block 100) and whether or not the memory operation is misaligned may be predicted (decision block 102).

If the memory operation is not predicted to be misaligned (block 102, "no" leg), one memory access may be performed for the fetched memory operation (block 104). The memory access may be a read or a write, depending on whether the memory operation is a load or a store. Block 104 may be implemented in a variety of fashions. For example, one memory operation microop may be generated by the decode unit. Alternatively, one memory access may be scheduled during execution of the memory operation. If the memory operation is actually misaligned (decision block 106, "yes" leg), the memory operation and subsequent instructions may be flushed and the memory operation may be refetched (block 108). Additionally, the misalign predictor may be updated to predict misaligned for the memory operation (block 110).

If the memory operation is predicted to be misaligned (block 102, "yes" leg), two memory accesses may be performed for the fetched memory operation (block 112). The memory accesses may be reads or writes, depending on whether the memory operation is a load or a store. Block 112 may be implemented in a variety of fashions. For example, two memory operation microops may be generated by the decode unit. Alternatively, two memory accesses may be scheduled during execution of the memory operation. If the memory operation is actually aligned (decision block 114, "yes" leg), the misalign predictor may be updated to predict aligned for the memory operation (block 110). Other embodiments may not update the misalign predictor in this case.

While FIG. 9 shows one or two accesses being performed for aligned and misaligned predictions, other embodiments may generally support a first number of accesses and a second number of accesses greater than the first number for the aligned and misaligned cases, respectively. For example, a string operation may be performed as a first number of accesses is if aligned, and a second number of accesses greater than the first number if misaligned.

Numerous variations and modifications will become apparent to those skilled in the art once the above disclosure is fully appreciated. It is intended that the following claims be interpreted to embrace all such variations and modifications.

What is claimed is:

1. A processor comprising:
   a circuit coupled to receive an indication of a memory operation to be executed in the processor, wherein the circuit is configured to predict whether or not the memory operation is misaligned responsive to the indication, and wherein the indication comprises at least a portion of an address that locates an instruction corresponding to the memory operation in memory;
   wherein a number of accesses performed by the processor to execute the memory operation is dependent on whether or not the circuit predicts the memory operation as misaligned.

2. The processor as recited in claim 1 further comprising a decode unit coupled to the circuit, wherein the decode unit is configured to generate a generated memory operation for each access responsive to the prediction of the circuit.

3. The processor as recited in claim 2 further comprising an address generation unit coupled to receive the generated memory operations generated by the decode unit, wherein the address generation unit is configured to generate an address for each generated memory operation during execution of the generated memory operation.

4. The processor as recited in claim 3 wherein the address generation unit comprises a misalignment detector configured to detect misalignment of a given memory operation during execution of the given memory operation, and wherein, if the misalignment detector detects misalignment of the given memory operation and the circuit did not predict the misalignment, the misalignment detector is configured to signal the circuit.

5. The processor as recited in claim 4 wherein the misalignment detector is further configured to detect a lack of misalignment for the given memory operation and, if misalignment was predicted for the given memory operation, the misalignment detector is configured to signal the circuit.

6. The processor as recited in claim 5 wherein the circuit is configured to update to not predict misalignment for the given memory operation responsive to the misalignment detector signalling no misalignment for the given memory operation.

7. The processor as recited in claim 4 wherein the circuit is configured to update to predict misalignment for the given memory operation responsive to the misalignment detector signalling misalignment for the given memory operation.

8. The processor as recited in claim 1 wherein the circuit comprises a memory configured to store a plurality of indications of memory operations previously detected as misaligned during execution in the processor, and wherein the circuit is configured to compare the plurality of indications to the received indication to predict misalignment.

9. The processor as recited in claim 8 wherein the plurality of indications each comprise at least a portion of an address that locates an instruction that corresponds to each memory operation in memory.

10. The processor as recited in claim 1 further comprising an execution core configured to execute the memory operation, wherein the execution core is configured to perform the number of accesses responsive to the prediction.

11. A misalignment predictor coupled to receive an indication of a memory operation, the misalignment predictor comprising:
  a memory configured to store a plurality of indications of memory operations previously detected as misaligned during execution in a processor, wherein each indication comprises at least a portion of an address the locates an instruction that corresponds to the memory operation in memory; and
  a control circuit coupled to the memory and configured to predict whether or not a memory operation is misaligned responsive to a comparison of the received indication and the plurality of indications stored in the memory.

12. The misalignment predictor as recited in claim 11 further coupled to receive a signal that a given memory operation is detected as misaligned during execution of the given memory operation, wherein the control circuit is configured to cause the memory to store the indication of the given memory operation responsive to the signal.

13. The misalignment predictor as recited in claim 11 further coupled to receive a signal that the memory operation was predicted as misaligned but is not misaligned, and wherein the control circuit is configured to update the memory to invalidate one of the plurality of indications that corresponds to the memory operation responsive to the signal.

14. The misalignment predictor as recited in claim 11 wherein the plurality of indications each comprise at least a portion of an address that locates an instruction that corresponds to each memory operation in memory.

15. The misalignment predictor as recited in claim 11 wherein the memory is further configured to store a plurality of offset indications, each of the plurality of offset indications corresponding to a respective one of the plurality of indications of memory operations and indicative, if a corresponding memory operation is a string operation, of one of a plurality of memory operations generated in response to the string operation, the one of the plurality of memory operations being misaligned during the previous execution.

16. A method comprising:
  predicting whether or not a memory operation to be executed in a processor is misaligned responsive to an indication corresponding to the memory operation, wherein the indication comprises at least a portion of an address that locates an instruction corresponding to the memory operation in memory;
  performing a first number of accesses to execute the memory operation responsive to a prediction of aligned; and
  performing a second number of accesses greater than the first number to execute the memory operation responsive to a prediction of misaligned.

17. The method as recited in claim 16 wherein performing a first number and performing a second number comprises generating a memory operation for each access responsive to the predicting.

18. The method as recited in claim 17 further comprising:
  generating an address for each memory operation during execution of the memory operation;
  detecting misalignment of a given memory operation during execution of the given memory operation; and
  responsive to detecting the misalignment and further responsive to not predicting the misalignment, updating a predictor that performs the predicting to predict misalignment for a subsequent fetch of the given memory operation.

19. The method as recited in claim 16 wherein the predicting comprises comparing a plurality of indications corresponding to previously executed memory operations to a received indication corresponding to the memory operation.

20. The method as recited in claim 19 wherein the plurality of indications and the received indication each comprise at least a portion of an address that locates an instruction that corresponds to each memory operation in memory.

21. The method as recited in claim 16 further comprising performing the first number of accesses or the second number of accesses responsive to the prediction during execution.

22. The processor as recited in claim 2 wherein the decode unit is further configured to generate a second operation between each generated memory operation, wherein the second operation, when executed, prepares an address operand for use by the following generated memory operation.

23. The processor as recited in claim 2 wherein, for a load memory operation, the decode unit is configured to generate one or more additional operations to merge the results of each generated memory operation to produce a final result of the load memory operation.

24. The method as recited in claim 17 further comprising generating a second operation between each generated memory operation, wherein the second operation, when executed, prepares an address operand for use by the following generated memory operation.

25. The method as recited in claim 17 further comprising, for a load memory operation, generate one or more additional operations to merge the results of the generated memory operations to produce a final result of the load memory operation.

26. A processor comprising:
  a circuit coupled to receive an indication of a memory operation to be executed in the processor, wherein the circuit is configured to predict whether or not the memory operation is misaligned responsive to the indication, wherein a number of accesses performed by the processor to execute the memory operation is dependent on whether or not the circuit predicts the memory operation as misaligned; and
  an address generation unit coupled to receive a given memory operation and configured to generate an address for the given memory operation during execution of the given memory operation, and wherein the address generation unit comprises a misalignment detector configured to detect misalignment of the given memory operation and to signal the circuit;
  wherein the circuit is configured to update to predict misalignment for the given memory operation responsive to the misalignment detector signalling misalignment for the given memory operation and the circuit not having predicted misalignment for the given memory operation.

27. The processor as recited in claim 26 further comprising a decode unit coupled to the circuit, wherein the decode unit is configured to generate a generated memory operation for each access responsive to the prediction of the circuit.

28. The processor as recited in claim 27 wherein the misalignment detector is further configured to detect a lack of misalignment for a second given memory operation and, if misalignment was predicted for the given memory operation, the misalignment detector is configured to signal the circuit.

29. The processor as recited in claim 28 wherein the circuit is configured to update to not predict misalignment for the second given memory operation responsive to the misalignment detector signalling no misalignment for the given memory operation.

30. The processor as recited in claim 26 wherein the circuit comprises a memory configured to store a plurality of indications of memory operations previously detected as misaligned during execution in the processor, and wherein the circuit is configured to compare the plurality of indications to the received indication to predict misalignment.

31. The processor as recited in claim 30 wherein the plurality of indications each comprise at least a portion of an address that locates an instruction that corresponds to each memory operation in memory.

* * * * *